(No Model.)
O. A. LANE.
BARK CONVEYER.
No. 276,605. Patented May 1, 1883.
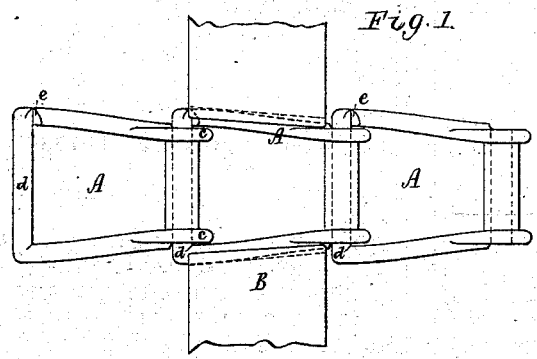
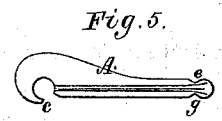
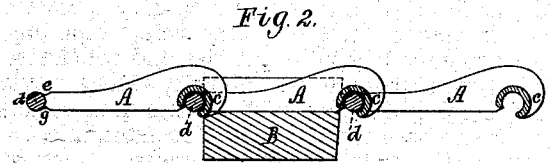
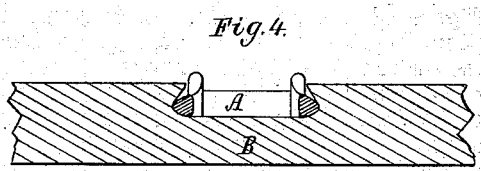
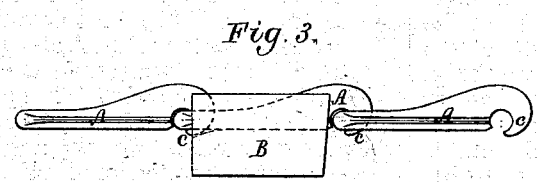
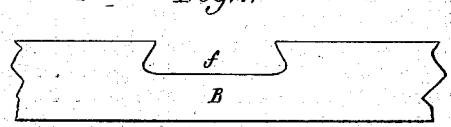
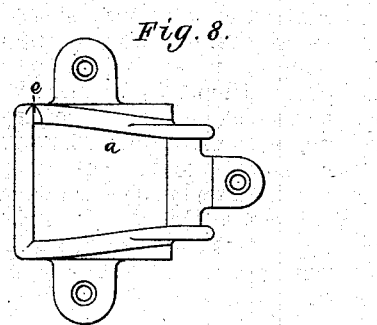
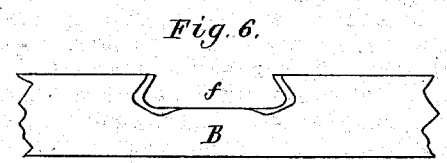
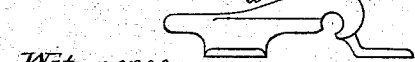
Witnesses
J. N. Piper
E. B. Pratt
Inventor,
Oliver Augustus Lane,
by R. H. Eddy att'y
N. PETERS, Photo-Lithographer, Washington, D. C.

UNITED STATES PATENT OFFICE.

OLIVER A. LANE, OF PEABODY, MASSACHUSETTS.

BARK-CONVEYER.

SPECIFICATION forming part of Letters Patent No. 276,605, dated May 1, 1883.

Application filed March 19, 1883. (No model.)

*To all whom it may concern:*

Be it known that I, OLIVER AUGUSTUS LANE, of Peabody, in the county of Essex, of the State of Massachusetts, have invented a new and useful Improvement in Bark-Conveyers; and I do hereby declare the same to be described in the following specification and represented in the accompanying drawings, of which—

Figure 1 is a top view, Fig. 2 a longitudinal section, Fig. 3 a side view, and Fig. 4 a transverse section, of part of a conveyer containing my improvement. Fig. 5 is an edge view of one of the links of the endless chain of such conveyer. Fig. 6 is a rear elevation, and Fig. 7 a front elevation, of one of the lags of the conveyer. Fig. 8 is a top view, and Fig. 9 a side view, of a lag-attaching link, such as used before my invention.

My said invention relates to the endless chains and lags or devices connected therewith for conveying bark or grain or various other matters from one position to another, it being specially useful for what in tanneries are termed "ground-bark conveyers," each of which in the main consists of an endless chain and a series of lags or bars, such lags or bars being arranged at equal distances apart and fixed or held to the chain, and the latter being extended around and supported by two spider or sprocket wheels. The conveyer so constructed is arranged to extend within a trough, through which, lengthwise of it, the chain in moving drags the lags and causes them to force along with them the bark or material to be transferred from one position to another or higher one.

Previous to my invention it has been customary to construct certain links of the chain with ears extending from them and formed as shown in Figs. 8 and 9 at *a a*, the lag being fastened to the link by screws going through the ears. These ears are very liable to become broken from the link, and thereby render it useless, and to necessitate the substitution of another, frequently at considerable expense, inconvenience, or loss to the tanner. With my invention the links of the chain are all alike and require no such means of connection of any of them with a lag, which may be attached to any one of them throughout the chain. In Figs. 1, 2, 3, and 4 these links are shown at A A A and a lag at B. Each link tapers lengthwise and crosswise; or, in other words, it is not only dovetailed in form lengthwise of it, but is also transversely of it, as represented. It is hooked, as shown at *c*, at one end to clasp the cylindrical end part, *d*, of the next link, each link being notched, as shown at *e* and *g*, to enable it to be coupled with or uncoupled from another link. The lag B has made in it a notch or recess, *f*, to receive a link, such notch or recess being tapering or dovetailed both lengthwise and widthwise of it to receive and fit to a link, which, previous to being engaged with its two next adjacent links, between which it is to extend, is to be placed within the notch or recess. Instead of this double dovetailed notch or recess being formed immediately within the bar or lag, it may be in a block or piece of metal screwed or fastened to the lag. While the dovetails of the link will keep the lag from slipping off the link in one direction transversely and in another lengthwise of it, the next link, by extending transversely beyond the lag-link, as shown, will prevent the lag from slipping off its link in the opposite direction longitudinally of the link. Thus by having to the lag a double dovetailed recess or link-socket, as described, and by having the chain-links made as represented, we not only can readily adapt a lag to any link of the chain, but keep it in place without any screws or ears or other fastenings, as heretofore employed; and when a tanner is provided with auxiliary links he can, in case of breakage of any one of the chains, readily supply its place with another.

Instead of a lag, a bucket may be used, and be provided with a double dovetailed recess or link-socket, as described, to receive a link of the chain.

I claim—

The combination, with a chain having each link dovetailed lengthwise and crosswise of it, as specified, of one or more lags or buckets, each of which is provided with a link-receiving socket or recess counter-dovetailed to fit or engage with the link, all being substantially as set forth.

OLIVER AUGUSTUS LANE.

Witnesses:
R. H. EDDY,
E. B. PRATT.